US011999376B2

United States Patent
Zhang et al.

(10) Patent No.: US 11,999,376 B2
(45) Date of Patent: Jun. 4, 2024

(54) SYSTEMS, METHODS, AND COMPUTER-READABLE MEDIA FOR SPATIO-TEMPORAL MOTION PLANNING (71) Applicants: Weize Zhang, Markham (CA); Peyman Yadmellat, North York (CA)

(72) Inventors: Weize Zhang, Markham (CA); Peyman Yadmellat, North York (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 134 days.

(21) Appl. No.: 17/590,707

(22) Filed: Feb. 1, 2022

(65) Prior Publication Data
US 2023/0242142 A1 Aug. 3, 2023

(51) Int. Cl.
*B60W 60/00* (2020.01)
*B60W 40/107* (2012.01)
*B60W 40/109* (2012.01)

(52) U.S. Cl.
CPC ........ *B60W 60/001* (2020.02); *B60W 40/107* (2013.01); *B60W 40/109* (2013.01); *B60W 2554/4041* (2020.02)

(58) Field of Classification Search
CPC ............. B60W 60/001; B60W 40/107; B60W 40/109; B60W 2554/4041
(Continued)

(56) References Cited

U.S. PATENT DOCUMENTS 9,216,745 B2 * 12/2015 Beardsley ........ G08G 1/096816
2016/0379168 A1 * 12/2016 Foerster ......... G06Q 10/063116
705/7.16
(Continued)

FOREIGN PATENT DOCUMENTS

CN 111845774 A 10/2020
CN 112068545 A 12/2020
(Continued)

OTHER PUBLICATIONS

Werling, Moritz, Julius Ziegler, Sören Kammel, and Sebastian Thrun. "Optimal trajectory generation for dynamic street scenarios in a frenet frame." In 2010 IEEE International Conference on Robotics and Automation, IEEE 2010.
(Continued)

*Primary Examiner* — Richard A Goldman (57) ABSTRACT

Systems, methods and computer-readable media for spatio-temporal motion planning, including: receiving data defining a drivable area within a spatio-temporal space; generating a cost function to be minimized that includes one or more upper-bound cost terms, each upper-bound cost term approximating the upper-bound of a cost term for the trajectory for a spatial frame of the spatio-temporal space, each upper-bound cost term being expressed as one or more longitudinal-temporal cost terms and one or more lateral-temporal cost terms for the trajectory; and further cost terms for the trajectory for the spatio-temporal frames; computing, based on the constraints and cost function, a planned trajectory through the drivable area, the planned trajectory directory being optimized with respect to both spatial frame and the spatio-temporal frames. Optimizing the planned trajectory in the spatial frame in addition to the spatio-temporal frames can enable planning objectives for the spatial frame to be optimized, for example maintaining closeness to a reference path and minimizing lateral acceleration and directional oscillation.

21 Claims, 6 Drawing Sheets (58) Field of Classification Search
USPC .......................................................... 701/23
See application file for complete search history.

(56) References Cited

U.S. PATENT DOCUMENTS

| | | | | |
|---|---|---|---|---|
| 2017/0109827 | A1* | 4/2017 | Huang | G07C 5/008 |
| 2018/0120843 | A1* | 5/2018 | Berntorp | G06N 3/08 |
| 2018/0274934 | A1* | 9/2018 | Agrawal | G01C 21/3438 |
| 2021/0200212 | A1 | 7/2021 | Urtasun | |
| 2021/0403034 | A1* | 12/2021 | Lapin | B60W 50/0098 |
| 2022/0035375 | A1* | 2/2022 | Rezaee | G05B 13/027 |
| 2022/0234614 | A1* | 7/2022 | Frazzoli | B60W 30/143 |
| 2022/0276625 | A1* | 9/2022 | Metzger | G05B 15/02 |
| 2022/0301421 | A1* | 9/2022 | Yuan | G08G 1/0137 |
| 2023/0084578 | A1* | 3/2023 | Sadeghi | B60W 30/095 |
| | | | | 701/23 |
| 2023/0242142 | A1* | 8/2023 | Zhang | B60W 60/0011 |
| | | | | 701/23 |

FOREIGN PATENT DOCUMENTS

| | | | | |
|---|---|---|---|---|
| CN | 112677995 A | * | 4/2021 | ............ B60W 30/12 |
| CN | 112677995 A | | 4/2021 | |
| WO | WO-2023039707 A1 | * | 3/2023 | .......... B60W 60/001 |

OTHER PUBLICATIONS

Ding, Wenchao, Lu Zhang, Jing Chen, and Shaojie Shen. "Safe trajectory generation for complex urban environments using spatio-temporal semantic corridor." IEEE Robotics and Automation Letters 4, No. 3 2019.

Li, Jialun, Xiaojia Xie, Hengbo Ma, Xiao Liu, and Jianping He. "Speed Planning Using Bezier Polynomials with Trapezoidal Corridors." arXiv preprint arXiv:2104.11655 2021.

Xu, Wenda, Qian Wang, and John M. Dolan. "Autonomous Vehicle Motion Planning via Recurrent Spline Optimization." In 2021 IEEE International Conference on Robotics and Automation 2021.

* cited by examiner

SYSTEMS, METHODS, AND COMPUTER-READABLE MEDIA FOR SPATIO-TEMPORAL MOTION PLANNING

FIELD

The present disclosure is related to systems, methods, and computer-readable media for spatio-temporal motion planning.

BACKGROUND

An autonomous vehicle (e.g., a self-driving car) is a vehicle that includes different types of sensors to sense an environment surrounding the vehicle (e.g., the presence and state of stationary and dynamic objects that are in the vicinity of the vehicle) and operating parameters of the vehicle (e.g., vehicle speed, acceleration, pose, etc.) and is capable of operating itself safely without any human intervention. An autonomous vehicle typically includes various software systems for perception and prediction, localization and mapping, as well as for planning and control. The software system for planning (generally referred to as a planning system) plans a trajectory for the vehicle to follow based on target objectives, the vehicle's surrounding environment, and physical parameters of the vehicle (e.g., wheelbase, vehicle width, vehicle length, etc.). A software system for control of the vehicle (e.g., a vehicle control system) receives the trajectory from the planning system and generates control commands to control operation of the vehicle to follow the trajectory.

The planning system may include multiple planners (which may also be referred to as planning units, planning sub-systems, planning modules, etc.) arranged in a hierarchy. The planning system generally includes: a mission planner, a behavior planner, and a motion planner. The motion planner receives as input a behavior decision for the autonomous vehicle generated by the behavior planner as well as information about the vehicle state (including a sensed environmental data and vehicle operating data), and the road network the vehicle is travelling on and performs motion planning to generate a trajectory for the autonomous vehicle. In the present disclosure, a trajectory includes a sequence, over multiple time stamps, of a position for the autonomous vehicle in a spatio-temporal coordinate system. Other parameters can be associated with the trajectory including vehicle orientation, vehicle velocity, vehicle acceleration, vehicle jerk or any combination thereof.

The motion planning system is configured to generate a trajectory that meets criteria such as safety, comfort and mobility within a spatio-temporal search space that corresponds to the vehicle state, the behavior decision, and the road network the vehicle is travelling on.

Spatio-temporal motion planning within a driving zone (e.g., a road or a lane of a road) can be considered from the perspective of three dimensions using Frenet coordinates, S, L, T, where S denotes a longitudinal distance along the tangent vector of the driving zone (e.g., a direction of travel), L denotes lateral distance to the normal vector of the driving zone (e.g., perpendicular to a direction of travel), and T denotes time. As used in this disclosure: an SLT space can refer to a geometric space where a position of a point is defined by three values of S, L, and T; an SLT frame (also referred to as SLT coordinate frame) uses three orthogonal vectors to uniquely specify the position of points in an SLT space; an SL, ST and LT (coordinate) frame each use of two orthogonal vectors to uniquely specify the position of points in a respective SL, ST, and LT plane.

The three dimensional Frenet SLT frame can be projected into three two dimensional frames as follows: (i) a ST frame, also known as longitudinal-temporal frame; (ii) LT frame, also known as lateral-temporal frame; and (iii) SL frame, also known as the longitudinal-lateral frame. The ST frame is the projection of an SLT frame in an ST plane. The ST frame has time and longitudinal coordinate axis, indicating an object's longitudinal coordinate with respect to time. The LT frame is the projection of an SLT frame in the LT plane. The LT frame has time and lateral coordinate axis, indicating an object's lateral coordinate with respect to time. The SL frame is the projection of an SLT frame in the SL plane. The SL frame has lateral and longitudinal coordinate axis, indicating an object's lateral coordinate with respect to its longitudinal coordinate. The Frenet SLT frame is a moving reference, typically having an origin point placed at the closest point to the vehicle on the mid-line of the driving zone (e.g., a road or a lane of a road). The position of the origin changes based on the position of the vehicle at each planning cycle.

Figure 1:
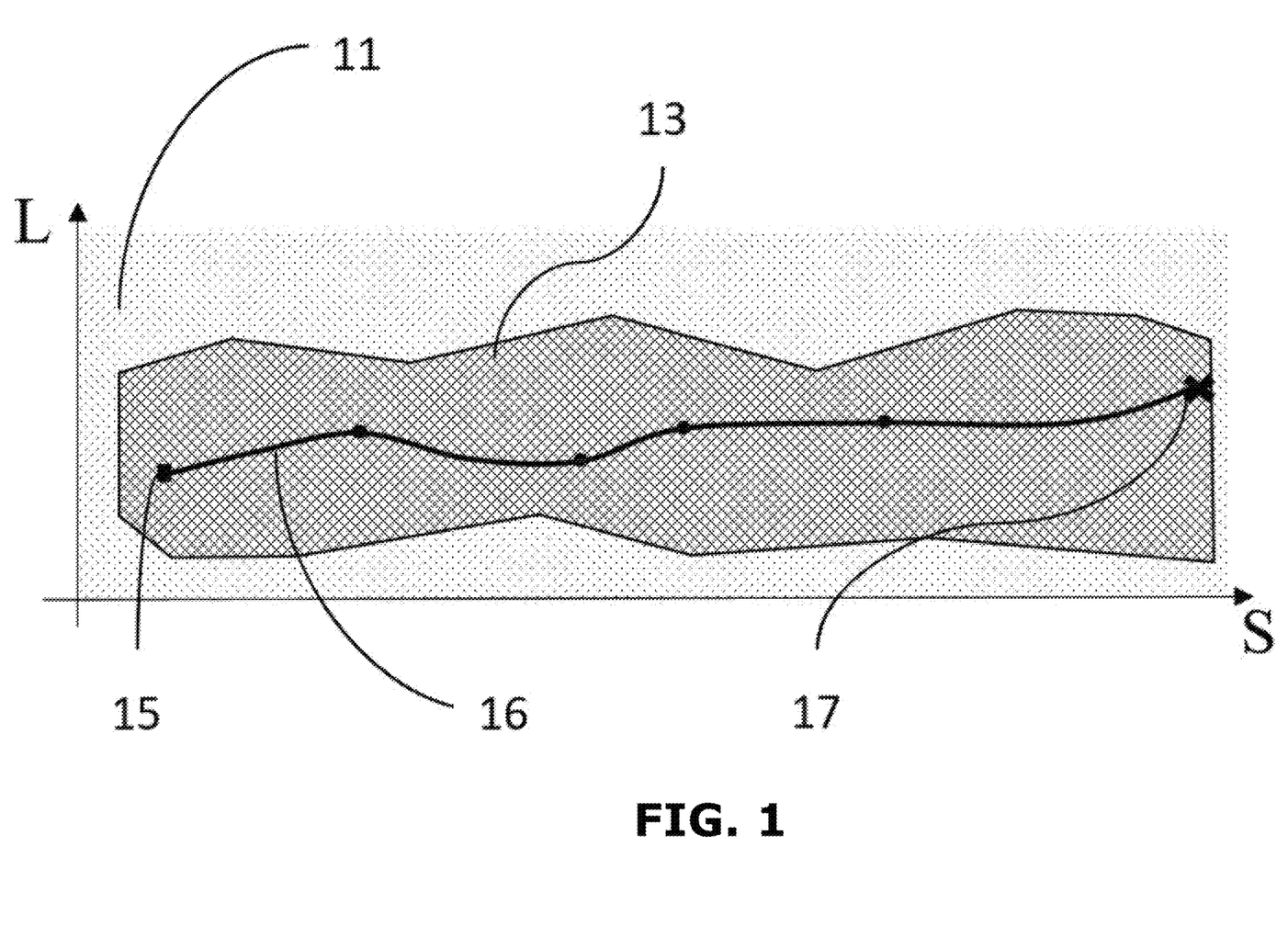
FIG. 1 shows a sample static driving scenario projected onto an SL plane.

To provide context for the present disclosure, FIG. 1 illustrates a sample driving scenario on a driving zone such as a road or lane of a road. For the sake of simplicity, the example of FIG. 1 is a static scenario (all objects are stationary). As such, the time-axis in this specific scenario can be omitted, and the search space is projected on an SL plane.

The dotted area represents an occupied or non-drivable area 11 (for example out of road boundary area), and the outlined diamond pattern represents an open space or drivable area 13. The SL plane projection 16 of a planned vehicle trajectory is represented by a line that extends through the drivable area from a start position 15 (e.g., a current vehicle position) to a target position 17.

To generate a planned trajectory in the SLT space, a common approach is to perform planning optimization which involves designing a cost function and using a quadratic programming optimization solver to find a trajectory that minimizes the total cost. A typical cost function in SLT space includes, but is not limited to, the following ST and LT frame cost terms, as shown in Equation 1:

$$\int_0^{T_{horizon}} [s(t) - s_r(t)]^2 dt$$ Equation 1

$$\int_0^{T_{horizon}} \left[\frac{d}{dt}s(t) - \frac{d}{dt}s_r(t)\right]^2 dt$$

$$\int_0^{T_{horizon}} [l(t) - l_r(t)]^2 dt$$

$$\int_0^{T_{horizon}} \left[\frac{d}{dt}l(t) - \frac{d}{dt}l_r(t)\right]^2 dt$$

Where t is time, $T_{verizon}$ is the horizon of time window of interest, s(t) and l(t) are the projections of the planned trajectory in ST and LT planes, respectively. $s_r(t)$ and $l_r(t)$ are the projections of a reference trajectory in ST and LT planes, respectively. These cost terms are all in L2 difference form, due to the fact that L2 difference can be transformed into a quadratic planning problem and is supported by most off-the-shelf optimizers. The first cost term of Equation 1 is a longitudinal difference between the candidate trajectory and the reference trajectory projected in the ST plane, the second cost term is a difference between the longitudinal changes over time (longitudinal speed) of the candidate trajectory and that of the reference trajectory; the third cost term is a lateral difference between the candidate trajectory and the reference trajectory projected in the LT plane; and the fourth cost term is a difference between the lateral changes over time (lateral speed) of the candidate trajectory and the reference trajectory. In some embodiments, a cost function in SLT space includes, in addition to ST and LT frame cost terms as shown in Equation 1, a cost term associated with a lateral and/or longitudinal acceleration along the trajectory and a cost term associated with a jerk along the trajectory. The cost term associated with a lateral and/or longitudinal acceleration along the trajectory and/or the cost term associated with a jerk along the trajectory may include higher-order derivatives of s(t), l(t), $s_r(t)$, and $l_r(t)$.

The cost terms in Equation 1 are all expressed in functions of time, and the integral is also over time, which can be transformed into a quadratic programming optimization problem (hereinafter referred to as "quadratic optimization problem"). However, the ST and LT frame cost terms do not consider cost in the SL frame. In some scenarios, it may be desired to improve the shape of the trajectory in the SL frame, instead of or in addition to the ST or LT frames. For instance, it may be necessary in some scenarios to minimize directional oscillation to make a planned trajectory easier for a vehicle controller to follow.

Examples of L2 cost terms in the SL frame and their corresponding meanings are as listed in Equation 2 below:

$$\int_0^{S_{T_{horizon}}} [l(s) - l_r(s)]^2 ds \quad \text{Equation 2}$$

(lateral difference compared to reference)

$$\int_0^{S_{T_{horizon}}} \left[\frac{d}{ds}l(s) - \frac{d}{ds}l_r(s)\right]^2 ds$$

(lateral slope difference compared to reference)

$$\int_0^{S_{T_{horizon}}} \left[\frac{d}{dt}\frac{d}{ds}l(s)\right]^2 ds$$

(lateral directional oscillation)

Where $S_{T_{horizon}}$ is the arc length along a reference trajectory in a time window of interest (0 to $T_{horizon}$), and $l_r$ is the reference trajectory projected in the SL plane. The cost terms of Equation 2 are a function of longitudinal dimension s, rather than temporal dimension t. The transformation between the LT/ST and SL frames is not linear, resulting in a nonlinear, non-quadratic problem that cannot be solved by a quadratic programming optimization solver.

Existing solutions generally ignore this issue by relying entirely on cost terms for ST and LT frames or placing limits on longitudinal speed to limit lateral defects, ignoring optimization in the SL frame. As a result, a planned trajectory can be negatively impacted by defects in SL frame such as directional oscillation or large curvatures.

Such defects result because optimizing in the ST and LT frames is not equivalent to optimizing in the SL frame. When there is a large longitudinal change, e.g., a harsh deceleration in the ST frame, the L2 difference cost terms in the LT frame alone may not be sufficient to guarantee smooth and comfortable planning. In contrast, the projections in the SL plane (that is using SL frame cost terms) can show more tangible changes. There is not a direct one-to-one relationship between conventional cost terms in the ST and LT frames to ideal cost terms in the SL frame. A trajectory that behaves well in the ST and LT frames may behave poorly in the SL frame.

Accordingly, there is a need for systems and methods that can enable optimization in the SL frame as well as the ST and LT frames.

SUMMARY

According to a first example aspect of the present disclosure is a computer implemented method for motion planning for an autonomous vehicle. The method includes receiving data defining a drivable area within a spatio-temporal space that includes first and second spatial dimensions and a time dimension, the first and second spatial dimensions defining a spatial frame, the first spatial dimension and time dimension defining a first spatio-temporal frame, and the second spatial dimension and time dimension defining a second spatio-temporal frame; generating a set of constraints for a trajectory within the drivable area; generating a cost function to be minimized that includes one or more upper-bound cost terms. Each upper-bound cost term approximates the upper-bound of a cost term for the trajectory for the spatial frame. Each upper-bound cost term is expressed as one or more longitudinal-temporal cost terms for the trajectory for the first spatio-temporal frame and one or more lateral-temporal cost terms for the second spatio-temporal frame. The method further includes computing, based on the set of constraints and the cost function, a planned trajectory through the drivable area, the planned trajectory directory being optimized with respect to each of the spatial frame, the first spatio-temporal frame and the second spatio-temporal frame and outputting the planned trajectory for controlling an operation of the autonomous vehicle. In some aspects of the method, the cost function to be minimized includes, in addition to the one or more upper-bound cost terms, one or more further cost terms for the trajectory for the first spatio-temporal frame and the second spatio-temporal frame In at least some scenarios, using one or more upper-bound cost terms that each approximate the upper-bound of a cost term for the trajectory for the spatial frame can advantageously allow an optimization problem solver, such as a quadratic programming optimization solver, to be used to optimize a motion planning trajectory in the spatial frame in addition to optimizing in the spatio-temporal frames such that planning objectives are also best optimized in the spatial frame, for example maintaining closeness to a reference path and minimizing lateral acceleration and directional oscillation.

In example aspects of the method, the set of constraints and the cost function collectively provide an optimization problem and computing the planned trajectory comprises using an optimization problem solver to determine an optimized solution based on the optimization problem.

In one or more of the preceding example aspects of the method, the first spatial dimension corresponds to a longitudinal direction of travel in the drivable area and second spatial dimension corresponds to a direction that is perpendicular to the longitudinal direction.

In one or more of the preceding example aspects of the method, the cost term for the trajectory for the spatial frame includes one or more of the following: a lateral difference of the trajectory projected onto the first plane relative to a reference trajectory projected onto the first plane; a difference between the lateral derivative of the trajectory with respect to the longitudinal coordinate (s) relative to that of a reference trajectory; and changes in the lateral derivatives of the trajectory with respect to the longitudinal coordinate (s) over time.

In one or more of the preceding example aspects of the method, the drivable area within the spatio-temporal space is defined using Frenet SLT coordinates, where the S coordinate corresponds to the first spatial dimension and denotes a longitudinal distance along a tangent vector of a driving zone, the L coordinate corresponds to the second spatial dimension and denotes a lateral distance to a normal vector of the driving zone, and the T coordinate corresponds to the time dimension and denotes time, the spatial frame is the SL frame, the first spatio-temporal frame is the ST frame and the second spatio-temporal frame is the LT frame.

In one or more of the preceding example aspects, the cost term for the trajectory for the spatial frame includes one or more of the following SL frame cost terms of the trajectory projected onto the SL frame:

$$\int_0^{S_{T_{horizon}}} [l(s) - l_r(s)]^2 ds \quad (a)$$

$$\int_0^{S_{T_{horizon}}} \left[\frac{d}{ds}l(s) - \frac{d}{ds}l_r(s)\right]^2 ds, \text{ and} \quad (b)$$

$$\int_0^{S_{T_{horizon}}} \left[\frac{d}{dt}\frac{d}{ds}l(s)\right]^2 ds \quad (c)$$

where: l(s) is a projection of the trajectory in the SL plane and $l_r$(s) is a projection of a reference trajectory in the SL plane, $T_{horizon}$ is a horizon of a time window of interest, and $S_{T_{horizon}}$ is an arc length along the reference trajectory in the time window of interest.

In one or more of the preceding example aspects of the method, the upper-bound of the SL frame cost term (a) is approximated by:
the upper-bound of the SL frame cost term (b) is approximated by:

$$\sum_{i=0}^{n-1} \left(\frac{1}{\frac{ds_r}{dt}(t_i)} + \frac{\eta(t_i)}{k_2}\right) \int_{t_i}^{t_{i+1}} \left[\frac{dl(t)}{dt} - \frac{dl_r(t)}{dt}\right]^2 dt +$$

$$\sum_{i=0}^{n-1} |k_2 \eta(t_i)| \int_{t_i}^{t_{i+1}} [s(t) - s_r(t)]^2 dt$$

or
the upper-bound of the SL frame cost term (c) is approximated by:

$$\sum_{i=0}^{n-1} \left\|\left(\frac{\frac{d^2s}{dt^2}(t_i)}{\frac{ds}{dt}(t_i)}\right)^2 - k_3 \left(\frac{\frac{d^2s}{dt^2}(t_i)}{\frac{ds}{dt}(t_i)}\right)\right\| \int_{t_i}^{t_{i+1}} \left[\frac{dl(t)}{dt}\right]^2 dt +$$

$$\sum_{i=0}^{n-1} \left|1 - \frac{1}{k_3}\left(\frac{\frac{d^2s}{dt^2}(t_i)}{\frac{ds}{dt}(t_i)}\right)\right| \int_{t_i}^{t_{i+1}} \left[\frac{dl^2(t)}{dt^2}\right]^2 dt$$

where: $k_1$, $k_2$ and $k_3$ are predefined positive numbers, n is a predefined positive integer, s(t) and l(t) are projections of the trajectory in the ST and LT planes, respectively. $s_r$ (t) and $l_r$(t) are projections of the reference trajectory in the ST and LT planes, respectively, and $$\eta(t) = \frac{1}{\frac{ds_r}{dt}(t)}\left(-\frac{\frac{d^2s}{dt^2}(t)\frac{dl}{dt}(t)}{\left(\frac{ds}{dt}(t)\right)^2} + \frac{\frac{d^2l}{dt^2}(t)}{\frac{ds}{dt}(t)}\right).$$

In some of the preceding example aspects of the method, the further cost terms comprise one or more of:

$$\int_0^{T_{horizon}} [s(t) - s_r(t)]^2 dt$$

$$\int_0^{T_{horizon}} \left[\frac{d}{dt}s(t) - \frac{d}{dt}s_r(t)\right]^2 dt$$

$$\int_0^{T_{horizon}} [l(t) - l_r(t)]^2 dt$$

$$\int_0^{T_{horizon}} \left[\frac{d}{dt}l(t) - \frac{d}{dt}l_r(t)\right]^2 dt$$

where s(t) and l(t) are projections of the trajectory in the ST and LT planes, respectively, and $s_r$ (t) and $l_r$(t) are projections of the reference trajectory in the ST and LT planes, respectively.

In one or more of the preceding example aspects of the method, generating the set of constraints for the trajectory within the drivable area comprises generating approximating constraints that approximate constraints for the trajectory for the spatial frame, the approximated constraints being expressed as constraints for the trajectory for the first spatio-temporal frame and the second spatio-temporal frame.

In one or more of the preceding example aspects of the method, the method further includes controlling at least one of a steering operation and a throttle operation of the autonomous vehicle to effect the planned trajectory.

In some aspects, the present disclosure provides a system for motion planning for an autonomous vehicle, the system comprising a processing system configured by instructions to cause the system to perform any of the aspects of the method described above.

In some aspects, the present disclosure provides a computer-readable medium storing instructions for execution by a processing system for motion planning for an autonomous vehicle. The instructions when executed cause the system to perform any of the aspects of the method described above.

BRIEF DESCRIPTION OF THE DRAWINGS

Reference will now be made, by way of example, to the accompanying drawings which show example embodiments of the present application, and in which.

The same reference numerals may be used in different figures to denote similar components.

DESCRIPTION OF EXAMPLE EMBODIMENTS

Methods, systems and computer-readable media for spatio-temporal motion planning motion are disclosed for optimizing a trajectory planning result in a three dimensional space that corresponds to first and second spatial dimensions and a temporal dimension. Examples will be described in the context of the SLT coordinate dimensions of a Frenet coordinate system, however the methods and systems disclosed herein can also be applied to other reference coordinate systems.

As noted above, existing solutions for planning optimization (i.e. optimized trajectory planning) rely on cost terms for the trajectory projected to two-dimensional planes that include spatial and temporal coordinates, namely the LT and ST planes. An example of an existing solution is described in Ding, Wenchao, Lu Zhang, Jing Chen, and Shaojie Shen. "Safe trajectory generation for complex urban environments using spatio-temporal semantic corridor." IEEE Robotics and Automation Letters 4, no. 3 (2019): 2997-3004 (referred to hereinafter as "Reference 1"). Selection of a target trajectory is treated as a quadratic programming optimization problem wherein the trajectory that minimizes the total cost of the set of cost terms subject to a set of respective constraint terms is computed using a quadratic programming optimization solver.

According to example aspects of the present disclosure, planning optimization is enhanced to also optimize a trajectory with respect to objectives defined based on the two dimensional (2D) frame that corresponds to the first and second spatial dimensions, (e.g., the SL frame defined by the S and L dimensions), in addition to the two-dimensional (2D) spatio-time frames corresponding to the first spatial dimension and temporal dimension (e.g., the ST frame defined by the S and T dimensions) and the second spatial dimension and temporal dimension (e.g., the LT frame defined by the L and T dimensions).

In at least some scenarios, this approach of optimizing a motion planning trajectory in the SL frame in addition to optimizing in the ST and LT frames can enable planning objectives to be addressed such that objectives are also best optimized in the SL frame, for example maintaining closeness to a reference path and minimizing lateral acceleration and directional oscillation.

As noted above, a quadratic optimization solution is not directly applicable for trajectory optimization in the SL frame. Thus, in order to enable the SL frame optimization using existing quadratic programming optimization solvers, according to aspects of the present disclosure, SL frame cost terms are approximated using further cost terms for the ST and LT frames in addition to the cost and constraint terms that are used by known solutions for ST and LT frame optimization. These further cost terms enable an optimization solution in the ST and LT frames, using a quadratic programming optimization solver, to also address optimization of the trajectory in the SL frame.

Figure 2:
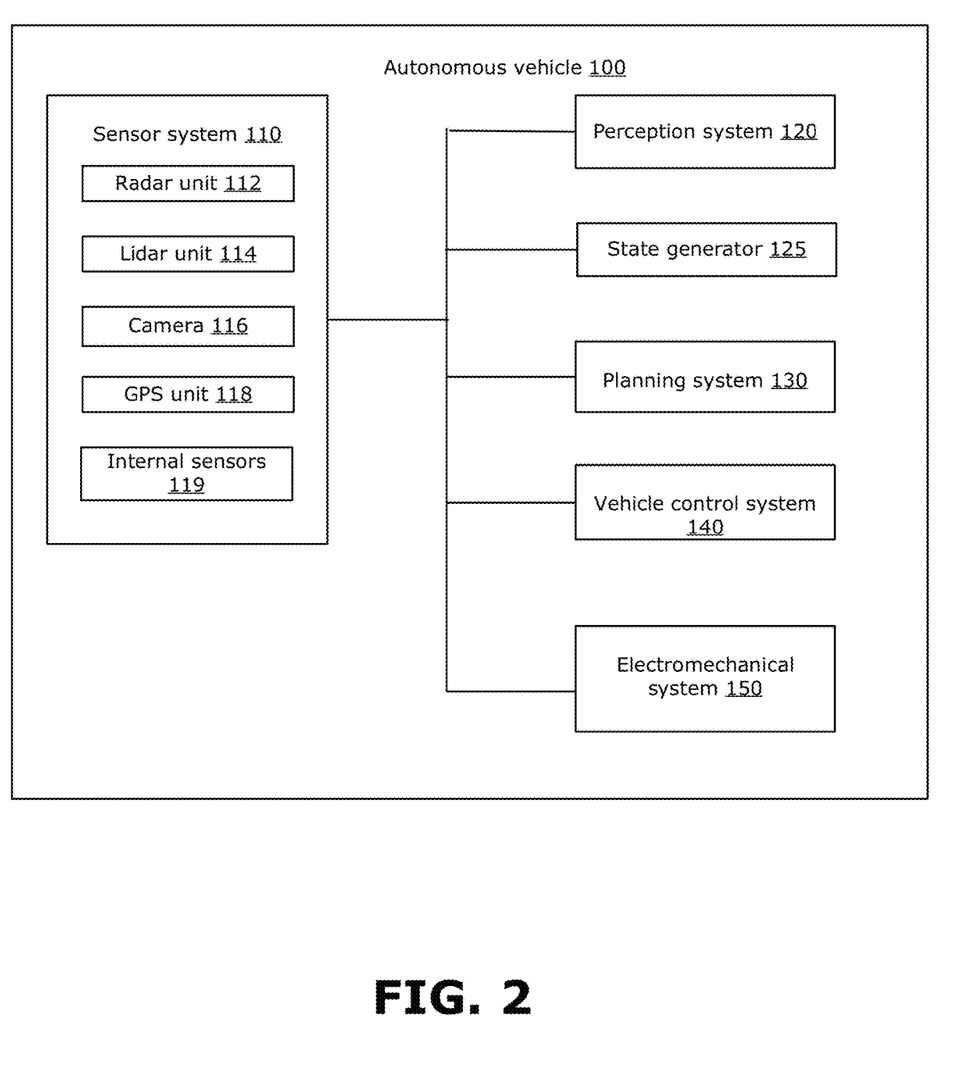
FIG. 2 is a block diagram illustrating some components of an example autonomous vehicle.
Figure 3:
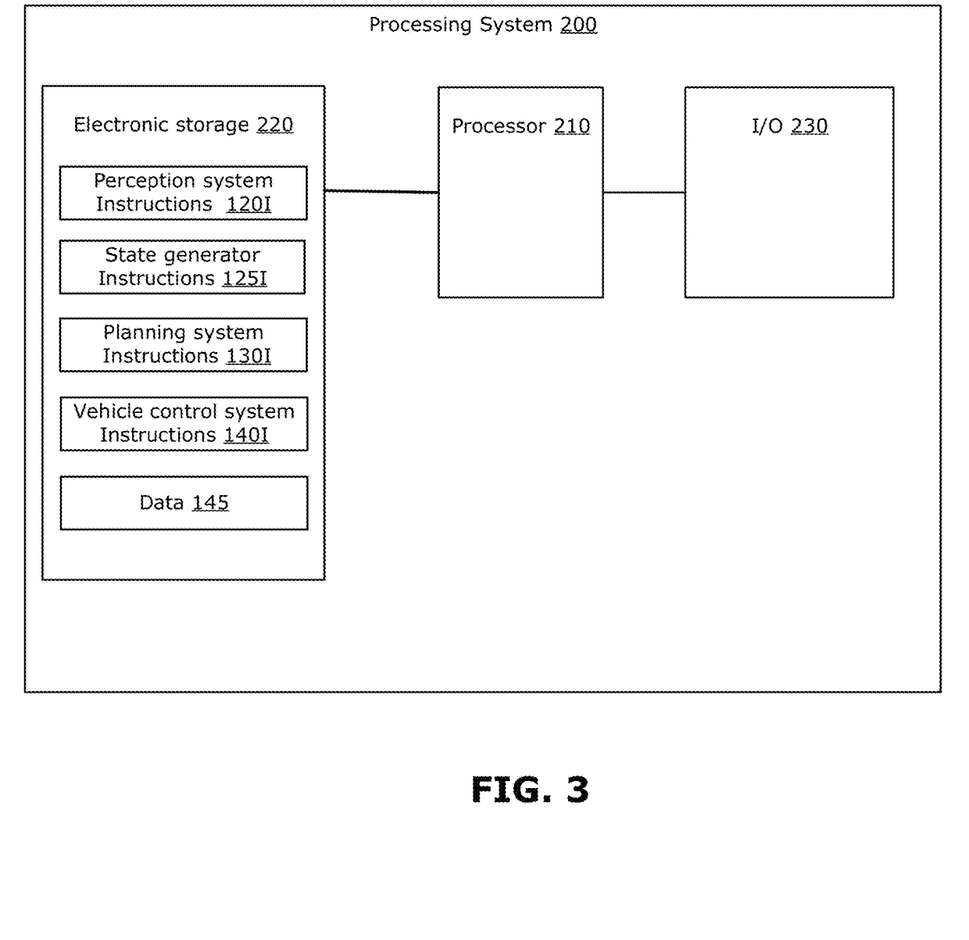
FIG. 3 is block diagram illustrating some components of a processing system that may be used to implement a planning system of the autonomous vehicle of FIG. 2 according to example embodiments.

A brief description of an autonomous vehicle to which the example planning systems and method described herein can be applied will now be provided with reference to FIGS. 2 and 3.

An autonomous vehicle typically includes various software systems for perception and prediction, localization and mapping, as well as for planning and control. The software system for planning (generally referred to as a planning system) plans a trajectory for the vehicle to follow based on target objectives and physical parameters of the vehicle (e.g. wheelbase, vehicle width, vehicle length, etc.). A software system for control of the vehicle (e.g. a vehicle control system) receives the trajectory from the planning system and generates control commands to control operation of the vehicle to follow the trajectory. Although examples described herein may refer to a car as the autonomous vehicle, the teachings of the present disclosure may be implemented in other forms of autonomous (including semi-autonomous) vehicles including, for example, trams, subways, trucks, buses, surface and submersible watercraft and ships, aircraft, drones (also referred to as unmanned aerial vehicles (UAVs)), warehouse equipment, manufacturing facility equipment, construction equipment, farm equipment, mobile robots such as vacuum cleaners and lawn mowers, and other robotic devices. Autonomous vehicles may include vehicles that do not carry passengers as well as vehicles that do carry passengers.

FIG. 2 is a block diagram illustrating certain components of an example autonomous vehicle 100. The vehicle 100 includes a sensor system 110, a perception system 120, a state generator 125, a planning system 130, a vehicle control system 140 and an electromechanical system 150, for example. Other systems and components may be included in the vehicle 100 but are not shown for ease illustration. The perception system 120, the planning system 130, and the vehicle control system 140 in this example are distinct software systems that include machine readable instructions that may, for example, be executed by one or more processors in a processing system of the vehicle 100. Various systems and components of the vehicle may communicate with each other, for example through wired or wireless communication.

The sensor system 110 includes various sensing units, such as a radar unit 112, a LIDAR unit 114, and a camera 116, for collecting information about an environment surrounding the vehicle 100 as the vehicle 100 operates in the environment. The sensor system 110 also includes a global positioning system (GPS) unit 118 for collecting information about a location of the vehicle in the environment. The sensor system 110 also includes one or more internal sensors 119 for collecting information about the physical operating conditions of the vehicle 100 itself, including for example sensors for sensing steering angle, linear speed, linear and angular acceleration, pose (pitch, yaw, roll), compass travel direction, vehicle vibration, throttle state, brake state, wheel traction, transmission gear ratio, cabin temperature and pressure, etc.

Information collected by each sensing unit of the sensor system 110 is provided as sensor data to the perception system 120. The perception system 120 processes the sensor data received from each sensing unit to generate data about the vehicle and data about the surrounding environment. Data about the vehicle includes, for example, one or more of data representing a vehicle location; data representing the physical attributes of the vehicle, such as width and length, mass, wheelbase, slip angle; and data about the motion of the vehicle, such as linear speed and acceleration, travel direction, angular acceleration, pose (e.g., pitch, yaw, roll), and vibration, and mechanical system operating parameters such as engine RPM, throttle position, brake position, and transmission gear ratio, etc.). Data about the surrounding environment may include, for example, information about detected stationary and moving objects around the vehicle 100, weather and temperature conditions, road conditions, road configuration and other information about the surrounding environment. For example, sensor data received from the radar, LIDAR and camera units 112, 114, 116 may be used to determine the local operating environment of the vehicle 100. Sensor data from GPS unit 118 and other sensors may be used to determine the vehicle's location, defining a geographic position of the vehicle 100. Sensor data from internal sensors 119, as well as from other sensor units, may be used to determine the vehicle's motion attributes, including speed and pose (i.e. orientation) of the vehicle 100 relative to a frame of reference.

The data about the environment and the data about the vehicle 100 output by the perception system 120 is received by the state generator 125. The state generator 125 processes data about the environment and the data about the vehicle 100 to generate a state for the vehicle 100 (hereinafter vehicle state). Although the state generator 125 is shown in FIG. 8 as a separate software system, in some embodiments, the state generator 125 may be included in the perception system 120 or in the planning system 130.

The vehicle state is output from the state generator 125 in real-time to the planning system 130, which is the focus of the current disclosure and will be described in greater detail below. The vehicle control system 140 serves to control operation of the vehicle 100 based on the trajectory output by the planning system 130. The vehicle control system 140 may be used to generate control signals for the electromechanical components of the vehicle 100 to control the motion of the vehicle 100. The electromechanical system 150 receives control signals from the vehicle control system 140 to operate the electromechanical components of the vehicle 100 such as an engine, transmission, steering system and braking system.

FIG. 3 illustrates an example of a processing system 200 that may be implemented in the vehicle 100. The processing system 200 includes one or more processors 210. The one or more processors 210 may include a central processing unit (CPU), a graphical processing unit (GPU), a tensor processing unit (TPU), a neural processing unit (NPU), a digital signal processor, and/or another computational element. The processor(s) 210 are coupled to an electronic storage(s) 220 and to one or more input and output (I/O) interfaces or devices 230 such as network interfaces, user output devices such as displays, user input devices such as touchscreens, and so on.

The electronic storage 220 may include any suitable volatile and/or non-volatile storage and retrieval device(s), including for example flash memory, random access memory (RAM), read only memory (ROM), hard disk, optical disc, subscriber identity module (SIM) card, memory stick, secure digital (SD) memory card, and other state storage devices. In the example of FIG. 8, the electronic storage 220 of the processing system 200 stores instructions (executable by the processor(s) 210) for implementing various system modules of autonomous vehicle 100, including for example the perception system 120 (instructions 1201), the state generator 125 (instructions 1251), the planning system 130 (instructions 1301), and the vehicle control system 140 (instructions 1401). In some embodiments, the electronic storage 220 also stores data 145, including sensor data provided by the sensor system 110, the data about the vehicle and the data about the environment output by the perception system 120 utilized by the planning system 130 to generate at least one of trajectories, and other data such as a road network map.

Figure 4:
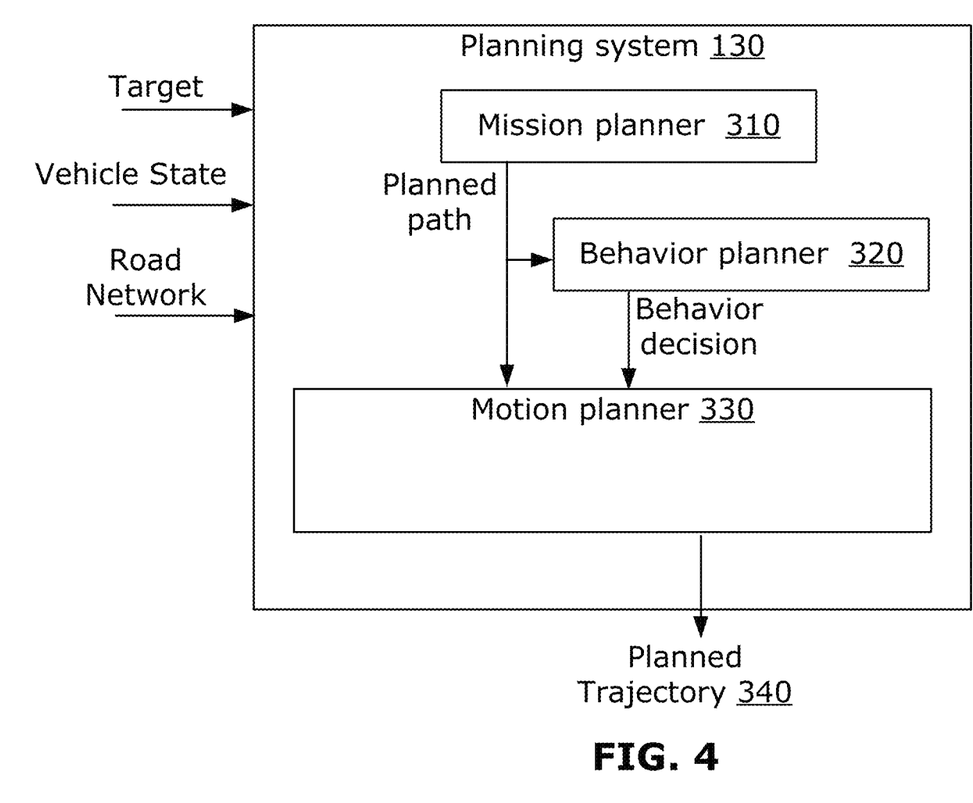
FIG. 4 is a block diagram illustrating further details of an example planning system.

FIG. 4 is a block diagram that illustrates further details of the planning system 130. The planning system 130 as shown can perform planning and decision making operations at different levels, for example at the mission level (e.g., mission planning performed by the mission planner 310), at the behavior level (e.g., behavior planning performed by the behavior planner 320) and at the motion level (e.g., motion planning performed by the motion planner 330). Mission planning is considered to be a higher (or more global) level of planning, motion planning is considered to be a lower (or more localized) level of planning, and behavior planning is considered to be a level between mission planning and motion planning. Generally, the output of planning and decision making operations at a higher level may form at least part of the input for a lower level of planning and decision making. As used here, a "module" can refer to a combination of a hardware processing circuit (e.g., the one or more processors 210) and machine-readable instructions (software and/or firmware) executable on the hardware processing circuit. In some examples, module can refer to a hardware processing circuit that has been configured to perform a specific function.

Generally, the purpose of planning and decision making operations is to determine a path and corresponding trajectories for the vehicle 100 to travel from an initial position (e.g., the vehicle's current position and orientation, or an expected future position and orientation) to a target position (e.g., a final destination defined by the user). As known in the art, a path is a sequence of configurations in a particular order (e.g., a path includes an ordered set of spatial coordinates) without regard to the timing of these configurations, whereas a trajectory is concerned about when each part of the path must be attained, thus specifying timing (e.g., a trajectory is the path with time stamp data, and thus includes a set of spatio-temporal coordinates). In some examples, an overall path may be processed and executed as a set of trajectories. The planning system 130 determines the appropriate path and trajectories with consideration of conditions such as the drivable ground (e.g., defined roadway), obstacles (e.g., pedestrians and other vehicles), traffic regulations (e.g., obeying traffic signals) and user-defined preferences (e.g., avoidance of toll roads).

Planning and decision making operations performed by the planning system 130 may be dynamic, i.e. they may be repeatedly performed as the environment changes. Thus, for example, the planning system 130 may receive a new vehicle state output by the state generator 125 and repeat the planning and decision making operations to generate a new plan and new trajectories in response to changes in the environment as reflected in the new vehicle state. Changes in the environment may be due to movement of the vehicle 100 (e.g., vehicle 100 approaches a newly-detected obstacle) as well as due to the dynamic nature of the environment (e.g., moving pedestrians and other moving vehicles).

Planning and decision making operations performed at the mission level (e.g. mission planning performed by the mission planner 310) relate to planning a path for the vehicle 100 at a high, or global, level. The first position of the vehicle 100 may be the starting point of the journey and the target position of the vehicle 100 may be the final destination point. Mapping a route to travel through a set of roads is an example of mission planning. Generally, the final destination point, once set (e.g., by user input) is unchanging through the duration of the journey. Although the final destination point may be unchanging, the path planned by mission planning may change through the duration of the journey.

For example, changing traffic conditions may require mission planning to dynamically update the planned path to avoid a congested road.

Input data received by the mission planner 310 for performing mission planning may include, for example, GPS data (e.g., to determine the starting point of the vehicle 100), geographical map data (e.g., road network from an internal or external map database), traffic data (e.g., from an external traffic condition monitoring system), the final destination point (e.g., defined as x- and y-coordinates, or defined as longitude and latitude coordinates), as well as any user-defined preferences (e.g., preference to avoid toll roads).

The planned path generated by mission planning performed by the mission planner 310 and output by the mission planner 310 defines the route to be travelled to reach the final destination point from the starting point. The output may include data defining a set of intermediate target positions (or waypoints) along the route.

The behavior planner 320 receives the planned path from the mission planner 310, including the set of intermediate target positions (if any). The behavior planner 320 also receives the vehicle state output by the state generator 125. The behavior planner 320 generates a behavior decision based on the planned path and the vehicle state, in order to control the behavior of the vehicle 100 on a more localized and short-term basis than the mission planner 310. The behavior decision may serve as a target or set of constraints for the motion planner 330. The behavior planner 320 may generate a behavior decision that is in accordance with certain rules or driving preferences. Such behavior rules may be based on traffic rules, as well as based on guidance for smooth and efficient driving (e.g., vehicle should take a faster lane if possible). The behavior decision output from the behavior planner 320 may serve as constraints on motion planning, for example.

The motion planner 330 is configured to iteratively find an optimized planned trajectory 340 to achieve the planned path in a manner that satisfies the behavior decision, and that navigates the environment encountered along the planned path in a relatively safe, comfortable, and speedy way.

Figure 5:
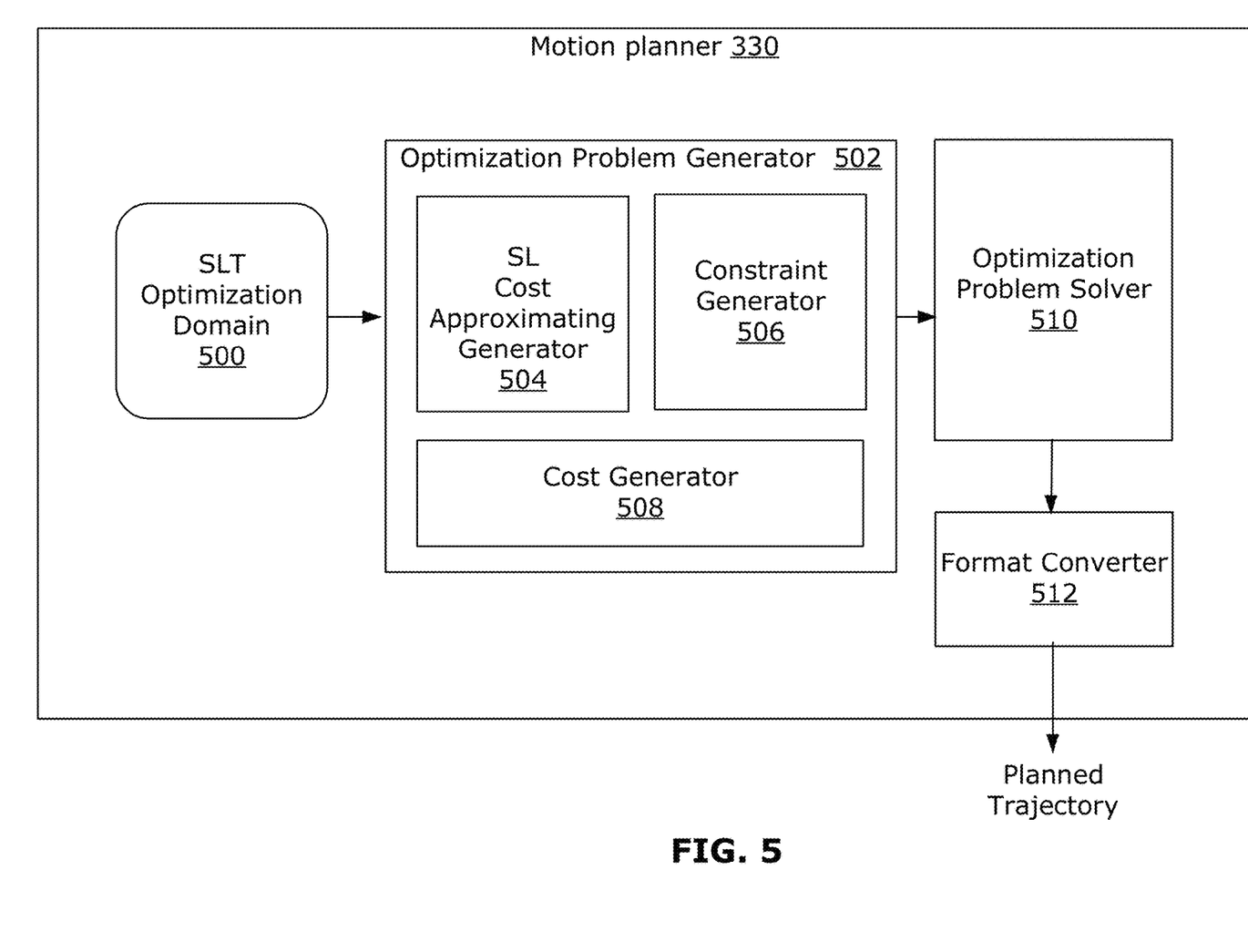
FIG. 5 is a block diagram showing sub-modules includes in a motion planner of the example planning system according to example embodiments.

FIG. 5 is a block diagram illustrating modules that can be included in the motion planner 330 according to example aspects. In the illustrated example, these modules include a generator 502 for generating an optimization problem formulation (hereinafter referred to as an optimization problem generator 502), a solver 510 for generating an optimized solution to the generated optimization problem formulation (hereinafter referred to as optimization problem solver 510), and a format converter 512 that are collectively configured to generate an optimized planned trajectory 340 based on an input SLT optimization domain 500. The SLT optimization domain 500 includes an indication of the boundaries of a drivable area 13 (FIG. 1) for a planning horizon duration for the autonomous vehicle 100, and can also include other data about the vehicle state, planned path and behavior decisions.

Optimization problem generator 502 is configured to generate a formulation of a trajectory optimization problem, and includes an SL cost approximating constraint generator 504, a constraint generator 506, and an optimization objective function generator, labelled as cost generator 508.

The SL cost approximating generator 504 is configured to generate cost terms that approximate SL costs but which can be solved using the optimization problem solver 510. Cost terms in ST and LT frames are generated that can approximate SL frame cost terms. In particular, ST plane and LT plane cost terms are generated that can result in equivalent planning objectives as those defined by SL plane cost terms.

Examples of L2 cost terms for the SL frame are as indicated above in Equation 2, which includes respective cost terms for: (a) a lateral difference of a candidate trajectory relative to a reference trajectory $$\left(\int_0^{S_{T_{horizon}}} [l(s) - l_r(s)]^2 ds\right);$$

(b) a difference in lateral derivative with respect to s for the candidate trajectory relative to that of the reference trajectory ( $$\int_0^{S_{T_{horizon}}} \left[\frac{d}{ds}l(s) - \frac{d}{ds}l_r(s)\right]^2 ds);$$

and (c) changes in lateral derivative with respect to s over time $$(\int_0^{S_{T_{horizon}}} \left[\frac{d}{dt}\frac{d}{ds}l(s)\right]^2 ds).$$

According to example embodiments, SL cost approximating generator 504 is configured to generate a set of upper-bound cost terms that enables optimization of the SL plane cost terms for a trajectory to be considered when solving for an optimized trajectory in the ST and LT frames.

By way of example, the upper-bounds of cost terms in the SL frame can be approximated using the ST and LT frame cost terms of Equation 3 as follows:

Equation 3 cost term in $SL$ plane $\leq$ $$\sum_{i=0}^{n-1} f_1(t_i) \int_{t_i}^{t_{i+1}} [l(t) - l_r(t)]^2 dt + \sum_{i=0}^{n-1} f_2(t_i) \int_{t_i}^{t_{i+1}} [s(t) - s_r(t)]^2 dt +$$

$$\sum_{i=0}^{n-1} f_3(t_i) \int_{t_i}^{t_{i+1}} \left[\frac{dl(t)}{dt} - \frac{dl_r(t)}{dt}\right]^2 dt +$$

$$\sum_{i=0}^{n-1} f_4(t_i) \int_{t_i}^{t_{i+1}} \left[\frac{ds(t)}{dt} - \frac{ds_r(t)}{dt}\right]^2 dt$$

where $f_1(t)$, $f_2(t)$, $f_3(t)$ and $f_4(t)$ are functions of time t, and $s_r(t)$ or $l_r(t)$ are a reference trajectory projected in the ST and LT planes respectively. The reference trajectory can be, for example, a mid-line of the driving zone (e.g., mid-line of road lane that the vehicle is travelling in) or the planned trajectory generated in a previous planning iteration. Note that in some cases, $s_r(t)$ or $l_r(t)$ could be 0. The interval [0, $T_{horizon}$] is decomposed into n small intervals, each is expressed as $[t_i, t_{i+1}]$, i=0, 1, . . . , n−1. In an illustrative embodiment, $T_{horizon}$=1.5, n=10, however different values can be used in other embodiments.

Table 1 below sets out each of the respective SL frame cost terms of Equation 2 with respective approximated upper-bound cost terms in ST frame and LT frame:

TABLE 1

Approximated Cost Upper-Bounds

| Cost Term in SL frame | Upper-Bound Cost Terms in ST/LT frames approximating the upper-bound of a Cost Term in SL frame |
|---|---|
| $\int_0^{S_{T_{horizon}}} [l(s) - l_r(s)]^2 \, ds$ <br><br> Lateral difference compared to reference | $\sum_{i=0}^{n-1} \left( \frac{ds_r}{dt}(t_i) + \frac{1}{k_1} \frac{dl}{dt}(t_i) \frac{\frac{ds_r}{dt}(t_i)}{\frac{ds}{dt}(t_i)} \right) \int_{t_i}^{t_{i+1}} [l(t) - l_r(t)]^2 \, dt +$ <br><br> $\sum_{i=0}^{n-1} \left( k_1 \frac{dl}{dt}(t_i) \frac{\frac{ds_r}{dt}(t_i)}{\frac{ds}{dt}(t_i)} \right) \int_{t_i}^{t_{i+1}} [s(t) - s_r(t)]^2 \, dt$ |
| $\int_0^{S_{T_{horizon}}} \left[ \frac{d}{ds} l(s) - \frac{d}{ds} l_r(s) \right]^2 ds$ <br><br> Lateral derivative with respect to s difference compared to that of reference | $\sum_{i=0}^{n-1} \left( \frac{1}{\frac{ds_r}{dt}(t_i)} + \frac{\eta(t_i)}{k_2} \right) \int_{t_i}^{t_{i+1}} \left[ \frac{dl(t)}{dt} - \frac{dl_r(t)}{dt} \right]^2 dt +$ <br><br> $\sum_{i=0}^{n-1} \left| k_2 \eta(t_i) \right| \int_{t_i}^{t_{i+1}} [s(t) - s_r(t)]^2 \, dt$ |
| $\int_0^{S_{T_{horizon}}} \left[ \frac{d}{dt} \frac{d}{ds} l(s) \right]^2 ds$ <br><br> Changes in lateral derivative with respect to s over time | $\sum_{i=0}^{n-1} \left( \left( \frac{\frac{d^2 s}{dt^2}(t_i)}{\frac{ds}{dt}(t_i)} \right)^2 - k_3 \left( \frac{\frac{d^2 s}{dt^2}(t_i)}{\frac{ds}{dt}(t_i)} \right) \right) \int_{t_i}^{t_{i+1}} \left[ \frac{dl(t)}{dt} \right]^2 dt +$ <br><br> $\sum_{i=0}^{n-1} \left| 1 - \frac{1}{k_3} \left( \frac{\frac{d^2 s}{dt^2}(t_i)}{\frac{ds}{dt}(t_i)} \right) \right| \int_{t_i}^{t_{i+1}} \left[ \frac{dl^2(t)}{dt^2} \right]^2 dt$ |

Where $$\eta(t) = \frac{1}{\frac{ds_r}{dt}(t)} \left( -\frac{\frac{d^2 s}{dt^2}(t) \frac{dl}{dt}(t)}{\left(\frac{ds}{dt}(t)\right)^2} + \frac{\frac{d^2 l}{dt^2}(t)}{\frac{ds}{dt}(t)} \right);$$

$k_1$, $k_2$ and $k_3$ could be any positive number. In the illustrated example, $k_1=0.1$, $k_2=k_3=10$;

n could be any positive integer. For the illustrated example, n=10;

All unknown terms (e.g. $\eta(t)$) are approximated with the value from the previous planning iteration (See for example published paper: Xu, Wenda, Qian Wang, and John M. Dolan. "Autonomous Vehicle Motion Planning via Recurrent Spline Optimization." In 2021 IEEE International Conference on Robotics and Automation, hereinafter referred to as Reference 2.). To avoid singularities, all unknown terms on the denominator (e.g. $\frac{ds}{dt}(t)$)

are saturated by any positive number. For the illustrated example, they are saturated to 1.

Accordingly, the cost terms in the SL frame are approximated with the upper-bounds of cost terms in the ST/LT frames. In an illustrative embodiment, the upper-bound of the following cost function in the SL frame is approximated, which is a combination of the three cost terms of Equation 2, with respective cost weighting values of 20, 10 and 0.7:

$$20 \int_0^{S_{T_{horizon}}} [l(s) - l_r(s)]^2 ds + \qquad \text{Equation 2}$$
$$10 \int_0^{S_{T_{horizon}}} \left[ \frac{d}{ds} l(s) - \frac{d}{ds} l_r(s) \right]^2 ds + 0.7 \int_0^{S_{T_{horizon}}} \left[ \frac{d}{dt} \frac{d}{ds} l(s) \right]^2 ds$$

In Equation 2, reference trajectory $l_r(s)$ is the SL plane projection of a reference trajectory. The reference trajectory can be, for example, a mid-line of the driving zone (e.g., mid-line of road lane that the vehicle is travelling in) or the planned trajectory generated in a previous iteration. The upper-bound of each of the three SL frame cost terms is approximated with the respective ST/LT cost terms presented in Table 1.

The constraint term generator 506 is configured to generate equality and inequality constraints for optimization variables. For example, these constraints can be the same as or similar to those described in Reference 1.

The cost generator 508 is configured to output a cost function to be minimized by a planned trajectory. In an example embodiment, the cost function includes weighted cost terms relating to the LT and ST frames that can be the same as or similar to those described in Reference 1, with addition of the upper-bound cost terms generated by SL cost approximating generator 504. In an example embodiment, the weighted cost terms relating to the LT and ST frames can be those identified in Equation 1 above, added to the upper-bound cost terms approximating SL frame cost terms, which can include the weighted LT and ST cost terms identified in Table 1.

Accordingly, the optimization problem generator 502 outputs a formulation of a trajectory optimization problem that includes an objective function to be minimized (e.g., the cost function provided by cost generator 508) and the constraints generated by constraint generator 506. Included in the objective function are cost terms that are specifically directed to optimization in the ST and LT frames (e.g., cost terms such as those in Equation 1), along with the upper-bound approximation of SL cost terms in ST and LT frames (e.g., cost terms in the right column of Table 1). In some embodiments, the formulation of a trajectory optimization problem output by the optimization problem generator 502 is a quadratic optimization problem.

The formulation of a trajectory optimization problem is provided as input to the optimization problem solver 510 which is configured to compute a set of optimized variables that define a curve, corresponding to the optimal trajectory that minimizes the sum of the weighted cost terms included in the cost function. The optimization problem solver 510 can be implemented using a number of different known optimization solvers, resulting in an optimized solution that may for example take the form of a Bezier curve, B-spline curve, spline curve, clothoid curve, or other polynomial curves. The optimized solution is the solution that minimizes the value of the cost function included in the trajectory optimization problem subject to the constraints that are included in the trajectory optimization problem. In some embodiments, the optimization problem solver 510 may be a quadratic programming optimization solver.

The curve generated by the optimization problem solver 510 is converted into a planned trajectory format suitable for the vehicle control system 140 by format converter 512. For example, the planned trajectory can indicate a sequence of planned future vehicle states for a set of future time stamps. Each of the vehicle states indicates a position for the autonomous vehicle in a spatio-temporal coordinate system, for example a travel zone (e.g., road) point that is defines by an s and/coordinate and a time stamp t. The planned future vehicle states can also indicate specified longitudinal (S axis) and lateral (L axis) speeds and accelerations for each of the time stamps.

The vehicle control system 140 is configured to send control signals to the electromechanical system 150 of the autonomous vehicle 100, for example steering, throttle and braking control signals, to control the autonomous vehicle 100 to execute the planned trajectory.

The addition of the upper-bound cost terms approximating SL cost terms can, in at least some scenarios, result in an optimization solution that optimizes a planned trajectory projected into all three planes (e.g., LS plane in addition to ST and LT planes). Such optimization can improve passenger safety and comfort by better controlling lateral acceleration and directional oscillation, among other things.

Although the description above has focussed on approximating SL frame cost terms using ST and LT frame cost terms, in further example embodiments it is possible to similarly approximate SL frame constraints using ST and LT frame constraints. Alternatively, SL frame constraints can be converted to SL cost terms using Lagrange multipliers method, Karush-Kuhn-Tucker conditions method, or similar methods, which can then be approximated using ST and LT frame cost terms.

Figure 6:
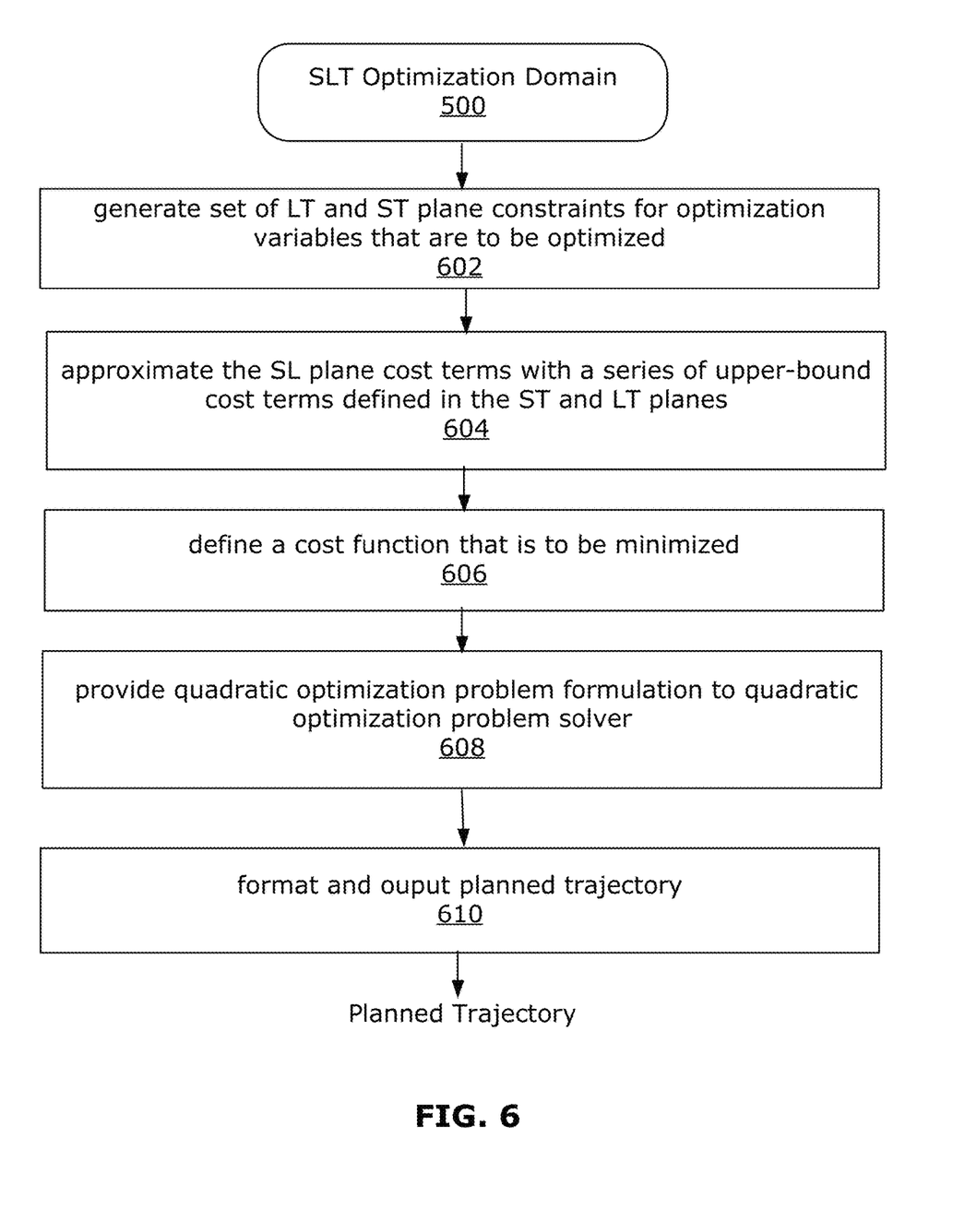
FIG. 6 is a flow diagram of a process performed by the motion planner, according to example embodiments.

Referring to FIG. 6, a flow chart summarizing the process described above as performed by the motion planner 330 to optimize a planned trajectory in the SL frame in addition to the ST and LT frames, according to example embodiments is shown.

The input includes the SLT optimization domain, which defines the drivable area as a set of all available points in the SLT space that are available for the planned trajectory. The SLT optimization domain can define corridor boundaries in SL coordinates for the planning time horizon that the trajectory must be confined within. This, in example embodiments, the SLT optimization domain defines a drivable area within a spatio-temporal space that includes first and second spatial dimensions and a time dimension, the first and second spatial dimensions defining a spatial frame (e.g., the SL frame), the first spatial dimension and time dimension defining a first spatio-temporal frame (e.g., the ST frame), and the second spatial dimension and time dimension defining a second spatio-temporal frame (e.g., the LT frame).

As indicated at block 602, constraint generator 506 generates a set of LT and ST frame constraints for optimization variables that are to be optimized. The optimization variables correspond to the variables that define a planned trajectory (e.g., optimization variables can correspond to include a time series of stamped vehicle state vectors that includes time (t) stamped longitudinal (s) and lateral (I) coordinates and possibly also time stamped lateral and longitudinal speed, acceleration, and jerk). In at least some example embodiments, SL frame constraints that exist can be approximated using ST and LT frame constraints, and these SL frame approximating constraints be added to the set of the conventional LT and ST frame constraints for optimization variables.

As indicated at block 604, SL frame cost approximating generator 504 generates upper-bound cost terms to approximate the upper-bound of SL frame cost terms (e.g., the SL frame cost terms of the left column of Table 1) with a series of upper-bound cost terms defined in the ST and LT frames (e.g., the upper-bound cost terms of the right column of Table 1 which include one or more longitudinal-temporal cost terms and one or more lateral-temporal cost terms).

As indicated at block 606, cost generator 508 adds the SL frame approximating cost terms in the ST and LT frames (e.g., the upper-bound cost terms of the right column of Table 1) to a set of cost terms for optimizing in the ST and LT frames (e.g., cost terms of Equation 1) to define a cost function that is to be minimized (e.g., an objective function for the optimization problem). Accordingly, the cost function includes upper-bound cost terms for the trajectory for the spatial frame, each upper-bound cost term approximating a cost term for the trajectory for the spatial frame, each upper-bound cost terms being expressed as one or more longitudinal-temporal cost terms for the trajectory for the first spatio-temporal frame and one or more lateral-temporal cost terms for the second spatio-temporal frame. In some embodiments, the cost function also includes further cost terms for the trajectory for the first spatio-temporal frame and the second spatio-temporal frame.

As indicated at block 608, the resulting quadratic optimization problem formulation (e.g., constraints on optimization variables and cost function) are provided to quadratic programming optimization solver 510 that outputs a set of optimized variables that collectively define a polynomial curve.

As indicated at block 610, the polynomial curve output of the quadratic optimization problem solver 510 is provided to format converter 512 that generates the planned trajectory. The planned trajectory is optimized with respect to each of the spatial frame, the first spatio-temporal frame and the second spatio-temporal frame.

The planned trajectory can then be used to control operation of the autonomous vehicle 200.

It should also be noted that the optimization solution described above can be included as a subset of optimizations. For example, in the case of vehicles that are capable of movement in three spatial dimensions such as an airborne drone or a submarine, constraint terms and/or cost terms for a third spatial-temporal frame (e.g., a vertical dimension-time frame) may need to be added to the computations.

Although examples have been described in the context of fully autonomous vehicles, it should be understood that the present disclosure is not limited to fully autonomous vehicles. For example, any vehicle that includes advanced driver-assistance system for a vehicle that includes a planning system may benefit from a motion planner that performs the trajectory generation, trajectory evaluation, trajectory selection operations of the present disclosure. Further, any vehicle that includes an automated driving system that can operate a vehicle fully autonomously or semi-autonomously may also benefit from a motion planner that performs the trajectory generation, trajectory evaluation, trajectory selection operations of the present disclosure. A planning system that includes the motion planner of the present disclosure may be useful for enabling a vehicle to navigate a structured or unstructured environment, with static and/or dynamic obstacles.

As used herein, the term "within" when used in the context of a range or boundary is inclusive of the values that define the outer range or boundary and all intermediate values between such values. For example, "within 1 to 10" includes the values 1 and 10 and all values there between. As used herein, statements that a second item (e.g., a signal, value, scalar, vector, matrix, calculation, or bit sequence) is "based on" a first item can mean that characteristics of the second item are affected or determined at least in part by characteristics of the first item. The first item can be considered an input to an operation or calculation, or a series of operations or calculations that produces the second item as an output that is not independent from the first item. As used herein, the terms "comprising", "comprises", "including" and "includes" are inclusive terms and do not exclude other elements or components that are not listed.

Although the present disclosure describes methods and processes with operations in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The contents of all publications referenced in this disclosure are incorporated by reference.

The invention claimed is:

1. A computer implemented method for motion planning for an autonomous vehicle, comprising:
   receiving data defining a drivable area within a spatio-temporal space that includes first and second spatial dimensions and a time dimension, the first and second spatial dimensions defining a spatial frame, the first spatial dimension and time dimension defining a first spatio-temporal frame, and the second spatial dimension and time dimension defining a second spatio-temporal frame;
   generating a set of constraints for a trajectory within the drivable area;
   generating a cost function to be minimized that includes one or more upper-bound cost terms, each upper-bound cost term approximating the upper-bound of a cost term for the trajectory for the spatial frame, each upper-bound cost term being expressed as one or more longitudinal-temporal cost terms for the trajectory for the first spatio-temporal frame and one of more lateral-temporal cost terms for the second spatio-temporal frame;
   computing, based on the set of constraints and the cost function, a planned trajectory through the drivable area, the planned trajectory directory being optimized with respect to each of the spatial frame, the first spatio-temporal frame and the second spatio-temporal frame; and
   outputting the planned trajectory for controlling an operation of the autonomous vehicle.

2. The method of claim 1, wherein the cost function further includes further cost terms for the trajectory for the first spatio-temporal frame and the second spatio-temporal frame.

3. The method of claim 1, wherein the set of constraints and the cost function collectively provide an optimization problem and computing the planned trajectory comprises using an optimization problem solver to determine an optimized solution based on the optimization problem.

4. The method of claim 1, wherein the first spatial dimension corresponds to a longitudinal direction of travel in the drivable area and second spatial dimension corresponds to a direction that is perpendicular to the longitudinal direction.

5. The method of claim 4, wherein the cost term for the trajectory for the spatial frame includes one or more of the following cost terms for the trajectory for the spatial frame: a lateral difference of the trajectory projected onto a first plane relative to a reference trajectory projected onto the first plane; a difference between the lateral derivative of the trajectory with respect to the longitudinal coordinate (s)

relative to that of a reference trajectory; or changes in the lateral derivatives of the trajectory with respect to the longitudinal coordinate (s) over time.

6. The method of claim 1, wherein the drivable area within the spatio-temporal space is defined using Frenet SLT coordinates, where the S coordinate corresponds to the first spatial dimension and denotes a longitudinal distance along a tangent vector of a driving zone, the L coordinate corresponds to the second spatial dimension and denotes a lateral distance to a normal vector of the driving zone, and the T coordinate corresponds to the time dimension and denotes time, the spatial frame is the SL frame, the first spatio-temporal frame is the ST frame and the second spatio-temporal frame is the LT frame.

7. The method of claim 6, wherein the cost term for the trajectory for the spatial frame includes one or more of the following SL frame cost terms for the trajectory projected onto the SL frame:

$$\int_0^{S_{T_{horizon}}} [l(s) - l_r(s)]^2 ds \quad (a)$$

$$\int_0^{S_{T_{horizon}}} \left[\frac{d}{ds}l(s) - \frac{d}{ds}l_r(s)\right]^2 ds, \text{ and} \quad (b)$$

$$\int_0^{S_{T_{horizon}}} \left[\frac{d}{dt}\frac{d}{ds}l(s)\right]^2 ds \quad (c)$$

where: $l(s)$ is a projection of the trajectory in a SL plane and $l_r(s)$ is a projection of a reference trajectory in the SL plane, $T_{horizon}$ is a horizon of a time window of interest, and $S_{T_{horizon}}$ is an arc length along the reference trajectory in the time window of interest.

8. The method of claim 7, wherein:

the upper-bound of the SL frame cost term (a) is approximated by:

$$\sum_{i=0}^{n-1}\left(\frac{ds_r}{dt}(t_i) + \frac{1}{k_1}\frac{dl}{dt}(t_i)\frac{\frac{ds_r}{dt}(t_i)}{\frac{ds}{dt}(t_i)}\right)\int_{t_i}^{t_{i+1}}[l(t) - l_r(t)]^2 dt +$$

$$\sum_{i=0}^{n-1}\left(k_1\frac{dl}{dt}(t_i)\frac{\frac{ds_r}{dt}(t_i)}{\frac{ds}{dt}(t_i)}\right)\int_{t_i}^{t_{i+1}}[s(t) - s_r(t)]^2 dt$$

the upper-bound of the SL frame cost term (b) is approximated by:

$$\sum_{i=0}^{n-1}\left(\frac{1}{\frac{ds_r}{dt}(t_i)} + \frac{\eta(t_i)}{k_2}\right)\int_{t_i}^{t_{i+1}}\left[\frac{dl(t)}{dt} - \frac{dl_r(t)}{dt}\right]^2 dt +$$

$$\sum_{i=0}^{n-1}|k_2\eta(t_i)|\int_{t_i}^{t_{i+1}}[s(t) - s_r(t)]^2 dt$$

or the upper-bound of the SL frame cost term (c) is approximated by:

$$\sum_{i=0}^{n-1}\left[\left(\frac{\frac{d^2s}{dt^2}(t_i)}{\frac{ds}{dt}(t_i)}\right)^2 - k_3\left(\frac{\frac{d^2s}{dt^2}(t_i)}{\frac{ds}{dt}(t_i)}\right)\right]\int_{t_i}^{t_{i+1}}\left[\frac{dl(t)}{dt}\right]^2 dt +$$

$$\sum_{i=0}^{n-1}\left|1 - \frac{1}{k_3}\frac{\frac{d^2s}{dt^2}(t_i)}{\frac{ds}{dt}(t_i)}\right|\int_{t_i}^{t_{i+1}}\left[\frac{dl^2(t)}{dt^2}\right]^2 dt$$

where: $k_1$, $k_2$ and $k_3$ are predefined positive numbers, n is a predefined positive integer, $s(t)$ is a projection of the trajectory in a ST plane, $l(t)$ is a projection of the trajectory in a LT planes and $s_r(t)$ and $l_r$ are projections of the reference trajectory in the ST plane and the LT plane, respectively, and $$\eta(t) = \frac{1}{\frac{ds_r}{dt}(t)}\left(-\frac{\frac{d^2s}{dt^2}(t)\frac{dl}{dt}(t)}{\left(\frac{ds}{dt}(t)\right)^2} + \frac{\frac{d^2l}{dt^2}(t)}{\frac{ds}{dt}(t)}\right).$$

9. The method of claim 2, wherein the further cost terms comprise one or more of:

$$\int_0^{T_{horizon}} [s(t) - s_r(t)]^2 dt$$

$$\int_0^{T_{horizon}} \left[\frac{d}{dt}s(t) - \frac{d}{dt}s_r(t)\right]^2 dt$$

$$\int_0^{T_{horizon}} [l(t) - l_r(t)]^2 dt$$

$$\int_0^{T_{horizon}} \left[\frac{d}{dt}l(t) - \frac{d}{dt}l_r(t)\right]^2 dt$$

where $s(t)$ is a projection of the trajectory in a ST plane, $l(t)$ is a projection of the trajectory in a LT planes, and $s_r(t)$ and $l_r(t)$ are projections of the reference trajectory in the ST plane and the LT plane, respectively.

10. The method of claim 1, wherein generating the set of constraints for the trajectory within the drivable area comprises generating approximating constraints that approximate constraints for the trajectory for the spatial frame, the approximated constraints being expressed as constraints for the trajectory for the first spatio-temporal frame and the second spatio-temporal frame.

11. The method of claim 1, comprising controlling at least one of a steering operation and a throttle operation of the autonomous vehicle to effect the planned trajectory.

12. A system for motion planning for an autonomous vehicle, the system comprising one or more processors and a memory storing executable instructions that, when executed by the one or more processors configure the system to perform a method comprising:

receiving data defining a drivable area within a spatio-temporal space that includes first and second spatial dimensions and a time dimension, the first and second spatial dimensions defining a spatial frame, the first spatial dimension and time dimension defining a first spatio-temporal frame, and the second spatial dimension and time dimension defining a second spatio-temporal frame;
generating a set of constraints for a trajectory within the drivable area;
generating a cost function to be minimized that includes one or more upper-bound cost terms, each upper-bound cost term approximating the upper-bound of a cost term for the trajectory for the spatial frame, each upper-bound cost term being expressed as one or more longitudinal-temporal cost terms for the trajectory for the first spatio-temporal frame and one or more lateral-temporal cost terms for the second spatio-temporal frame;
computing, based on the set of constraints and the cost function, a planned trajectory through the drivable area, the planned trajectory directory being optimized with respect to each of the spatial frame, the first spatio-temporal frame and the second spatio-temporal frame; and
outputting the planned trajectory for controlling an operation of the autonomous vehicle.

13. The system of claim 12, wherein the cost function further includes further cost terms for the trajectory for the first spatio-temporal frame and the second spatio-temporal frame.

14. The system of claim 12, wherein the set of constraints and the cost function collectively provide an optimization problem and computing the planned trajectory comprises using an optimization problem solver to determine an optimized solution based on the optimization problem.

15. The system of claim 12, wherein the first spatial dimension corresponds to a longitudinal direction of travel in the drivable area and second spatial dimension corresponds to a direction that is perpendicular to the longitudinal direction.

16. The system of claim 12, wherein the cost term for the trajectory for the spatial frame includes one or more of the following cost terms for the trajectory for the spatial frame: a lateral difference of the trajectory projected onto the first plane relative to a reference trajectory projected onto a first plane; a difference between the lateral derivative of the trajectory with respect to the longitudinal coordinate (s) relative to that of a reference trajectory; or changes in the lateral derivatives of the trajectory with respect to the longitudinal coordinate (s) over time.

17. The system of claim 12, wherein the drivable area within the spatio-temporal space is defined using Frenet SLT coordinates, where the S coordinate corresponds to the first spatial dimension and denotes a longitudinal distance along a tangent vector of a driving zone, the L coordinate corresponds to the second spatial dimension and denotes a lateral distance to a normal vector of the driving zone, and the T coordinate corresponds to the time dimension and denotes time, the spatial frame is the SL frame, the first spatio-temporal frame is the ST frame and the second spatio-temporal frame is the LT frame.

18. The system of claim 17, wherein the cost term includes one or more of the following SL frame cost terms of the trajectory projected onto the SL frame:

$$\int_0^{S_{T_{horizon}}} [l(s) - l_r(s)]^2 ds \quad \text{(a)}$$

$$\int_0^{S_{T_{horizon}}} \left[\frac{d}{ds}l(s) - \frac{d}{ds}l_r(s)\right]^2 ds, \text{ and} \quad \text{(b)}$$

$$\int_0^{S_{T_{horizon}}} \left[\frac{d}{dt}\frac{d}{ds}l(s)\right]^2 ds \quad \text{(c)}$$

where: $l(s)$ is a projection of the trajectory in a SL plane and $l_r(s)$ is a projection of a reference trajectory in the SL plane, $T_{horizon}$ is a horizon of a time window of interest, and $S_{T_{horizon}}$ is an arc length along the reference trajectory in the time window of interest.

19. The system of claim 18 wherein:
the SL frame cost term (a) is approximated by:

$$\sum_{i=0}^{n-1}\left(\frac{ds_r}{dt}(t_i) + \frac{1}{k_1}\frac{dl}{dt}(t_i)\frac{\frac{ds_r}{dt}(t_i)}{\frac{ds}{dt}(t_i)}\right)\int_{t_i}^{t_{i+1}} [l(t) - l_r(t)]^2 dt +$$

$$\sum_{i=0}^{n-1}\left(k_1\frac{dl}{dt}(t_i)\frac{\frac{ds_r}{dt}(t_i)}{\frac{ds}{dt}(t_i)}\right)\int_{t_i}^{t_{i+1}} [s(t) - s_r(t)]^2 dt$$

the SL frame cost term (b) is approximated by:

$$\sum_{i=0}^{n-1}\left(\frac{1}{\frac{ds_r}{dt}(t_i)} + \frac{\eta(t_i)}{k_2}\right)\int_{t_i}^{t_{i+1}}\left[\frac{dl(t)}{dt} - \frac{dl_r(t)}{dt}\right]^2 dt +$$

$$\sum_{i=0}^{n-1} |k_2\eta(t_i)| \int_{t_i}^{t_{i+1}} [s(t) - s_r(t)]^2 dt$$

or
the SL frame cost term (c) is approximated by:

$$\sum_{i=0}^{n-1}\left|\left(\frac{\frac{d^2s}{dt^2}(t_i)}{\frac{ds}{dt}(t_i)}\right)^2 - k_3\left(\frac{\frac{d^2s}{dt^2}(t_i)}{\frac{ds}{dt}(t_i)}\right)\right|\int_{t_i}^{t_{i+1}}\left[\frac{dl(t)}{dt}\right]^2 dt +$$

$$\sum_{i=0}^{n-1}\left|1 - \frac{1}{k_3}\left(\frac{\frac{d^2s}{dt^2}(t_i)}{\frac{ds}{dt}(t_i)}\right)\right|\int_{t_i}^{t_{i+1}}\left[\frac{dl^2(t)}{dt^2}\right]^2 dt$$

where: $k_1$, $k_2$ and $k_3$ are predefined positive numbers, n is a predefined positive integer, $s(t)$ is a projection of the trajectory in a ST plane, $l(t)$ is a projection of the trajectory in and a LT planes and $s_r(t)$ and $l_r(t)$ are projections of the reference trajectory in the ST plane and the LT plane, respectively, and $$\eta(t) = \frac{1}{\frac{ds_r}{dt}(t)}\left(-\frac{\frac{d^2s}{dt^2}(t)\frac{dl}{dt}(t)}{\left(\frac{ds}{dt}(t)\right)^2} + \frac{\frac{d^2l}{dt^2}(t)}{\frac{ds}{dt}(t)}\right).$$

20. The system of claim 12 wherein the further cost terms comprise one or more of:

$$\int_0^{T_{horizon}} [s(t) - s_r(t)]^2 dt$$

$$\int_0^{T_{horizon}} \left[\frac{d}{dt}s(t) - \frac{d}{dt}s_r(t)\right]^2 dt$$

$$\int_0^{T_{horizon}} [l(t) - l_r(t)]^2 dt$$

$$\int_0^{T_{horizon}} \left[\frac{d}{dt}l(t) - \frac{d}{dt}l_r(t)\right]^2 dt$$

where s(t) is a projection of the trajectory in a ST plane, l(t) is a projection of the trajectory in a LT plane and $s_r(t)$ and $l_r(t)$ are projections of the reference trajectory in the ST plane and the LT plane, respectively.

21. A non-transitory computer-readable medium storing instructions which, when executed by execution by a processing system, cause the processing system to perform a method comprising:

receiving data defining a drivable area within a spatio-temporal space that includes first and second spatial dimensions and a time dimension, the first and second spatial dimensions defining a spatial frame, the first spatial dimension and time dimension defining a first spatio-temporal frame, and the second spatial dimension and time dimension defining a second spatio-temporal frame;

generating a set of constraints for a trajectory within the drivable area;

generating a cost function to be minimized that includes one or more upper-bound cost terms, each upper-bound cost term approximating the upper-bound of a cost term for the trajectory for the spatial frame, each upper-bound cost term being expressed as one or more longitudinal-temporal cost terms for the trajectory for the first spatio-temporal frame and one or more lateral-temporal cost terms for the second spatio-temporal frame;

computing, based on the set of constraints and the cost function, a planned trajectory through the drivable area, the planned trajectory directory being optimized with respect to each of the spatial frame, the first spatio-temporal frame and the second spatio-temporal frame; and outputting the planned trajectory for controlling an operation of the autonomous vehicle.

\* \* \* \* \*